United States Patent [19]
Freiberg et al.

[11] 3,969,687
[45] July 13, 1976

[54] STANDING WAVE UNSTABLE RESONATORS FOR RADIAL FLOW LASERS

[75] Inventors: Robert J. Freiberg, South Windsor; George H. McLafferty, Manchester, both of Conn.

[73] Assignee: United Technologies Corporation, Hartford, Conn.

[22] Filed: Apr. 14, 1975

[21] Appl. No.: 568,084

[52] U.S. Cl. .............................. 331/94.5 C; 250/299
[51] Int. Cl.² ........................................ H01S 3/081
[58] Field of Search ................... 331/94.5; 350/299; 356/112

[56] References Cited
UNITED STATES PATENTS
| | | |
|---|---|---|
| 3,873,942 | 3/1975 | Reilly .............................. 331/94.5 C |
| 3,909,744 | 9/1975 | Wisher et al ................... 331/94.5 C |

Primary Examiner—William L. Sikes
Attorney, Agent, or Firm—Anthony J. Crisco

[57] ABSTRACT

A radial flow laser having an unstable resonator configuration with a standing wave optical path is disclosed. The gain medium forms a cylindrical sheath which is symmetric about a centerline axis through the resonator and the output beam is annular in cross section. The resonator geometry is based on a circular end mirror, an annular end mirror, an annular folding mirror having a reflective surface conforming to the inside of a cone geometry and conical folding mirror conforming to the outside of a cone geometry. Various embodiments are disclosed whereby the width of the resonant mode is either held constant or expanded to accommodate various power density loadings on the mirrors. In one configuration, the standing wave travels in a complete loop through the cylindrical sheath of gain medium.

11 Claims, 6 Drawing Figures

STANDING WAVE UNSTABLE RESONATORS FOR RADIAL FLOW LASERS

BACKGROUND OF THE INVENTION

1. Field of the Invention

The present invention relates to lasers which provide output beams having a high power and more particularly to unstable resonators for use in laser systems having a gaseous working medium which flows in the radial direction generating a cylindrical sheath of active medium.

2. Description of the Prior Art

Laser systems which provide an output beam at a very high power level such as those made possible with combustion driven chemical lasers are subject to various restraints which limit the actual output power from such a system. One of these limitations is due to a phenomenon which is commonly referred to as superfluorescense, a condition under which a gain medium having a population inversion produces spurious beams of laser radiation without an interaction with any reflecting surface. These spurious beams are undesirable because they deplete the population inversion which would otherwise be available for controlled stimulated emission from the working medium. Also these beams can be sufficiently powerful to expose various equipment in the area to damage.

One of the concepts advanced to increase the amount of working medium available without incurring superfluorescent effects is taught by Chenausky et al in the U.S. Pat. No. 3,921,096 entitled Unstable Split Mode Laser Resonator, filed on Dec. 16, 1974 and held with the present application by a common assignee. The essence of the split mode resonator concept is the use of two separate volumes of gain medium, each of which has dimensions no greater than the limitations imposed by superfluorescence. The individual volumes have no direct line of sight contact with one another although there is a region of common resonance in which the phase of the beam in each of the regions becomes locked to the phase of the beam from the other region. The invention is primarily for a high gain, short lifetime gaseous working medium which passes through the resonator in what is primarily an axial direction.

An unstable resonator concept having a radial mode pattern is disclosed by Chenausky et al in Application Ser. No. 568,083 entitled Laser Resonator Having Radial Propagation, filed on even date and held with the present application by a common assignee. The toroidal unstable resonator geometries described therein increase the volume of gain medium which can be accommodated without encountering superfluorescence which was not possible with the split mode resonator previously described. The direction in which the gain medium flows is again essentially axial.

Another approach to the problem involves arranging the gain medium in the form of a cylindrical sheath, such as that produced by a radial flow configuration, so that a relatively large volume can be handled without exceeding the superfluorescence length limitations. A relatively simple unstable resonator comprised of an annular convex toroidal surface at one end of the cylindrical working medium and an annular concave toroidal mirror at the other end of the cylinder is feasible. The utility of such a resonator configuration is severely limited by the poor optical quality of the laser beam which results therefrom. A conventional unstable resonator arranged in such a cylindrical geometry has a very high Fresnel number which is defined as the square of the outer diameter of the cylindrical sheath of active medium divided by four times the product of the laser wavelength and the length of the cylinder. This high Fresnel number is an indication of very little coupling of the beam phase front around the circumference of the cavity as the laser radiation propagates between the annular end mirrors and through the circumferentially oriented gain medium. As a consequence, such a resonator displays very poor mode discrimination and is prone to support high order azimuthal modes which have far field energy distributions exhibiting a minimum on axis and departing significantly from diffraction limited operation.

SUMMARY OF THE INVENTION

A primary object of the present invention is to provide a laser beam having both high power and good optical beam quality with an unstable resonator having the working medium in a cylindrical sheath configuration.

According to the present invention, an unstable resonator is formed having a centerline axis with a gain region in the configuration of a thin wall cylinder and disposed symmetrically about the centerline axis, and a cylindrical gas source region disposed adjacent to and internal of the gain region and symmetric about the centerline axis.

One feature of the present invention is the use of an active gain medium in the shape of a relatively thin wall cylinder. The system optics form an unstable resonator and the output beam is annular in cross section. The working medium flows radially outward from the centerline axis of the resonator and provides gain over a radial extent equal to the extraction length. The volume of gain medium is determined by the maximum axial length of the cylindrical sheath which can be accommodated in the resonator without incurring superfluorescence. Since the volume of the gain medium can be increased by simply increasing the inside diameter of the cylindrical sheath, the volume is essentially unlimited.

One of the primary advantages of the present invention is the high optical quality of the output beam which results from the effective discrimination against high order transverse modes provided by a region of common resonance which is dominated by diffractive cross coupling. Also, even a gain medium having a short decay time can be used to maximum advantage by locating the discharge nozzles along a cylindrical surface adjacent to the inner edge of the cylindrical gain region of the resonator.

The foregoing and other objects, features and advantages of the present invention will become more apparent in the light of the following detailed description of preferred embodiments thereof as illustrated in the accompanying drawing.

DESCRIPTION OF THE PREFERRED EMBODIMENT

Figure 1:
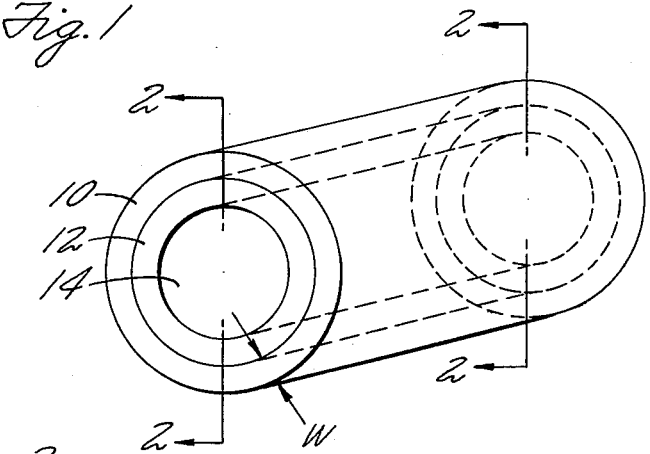
FIG. 1 is a simplified perspective view showing schematically the relationship between the major regions in an unstable resonator arranged in accordance with the present invention.
Figure 2:
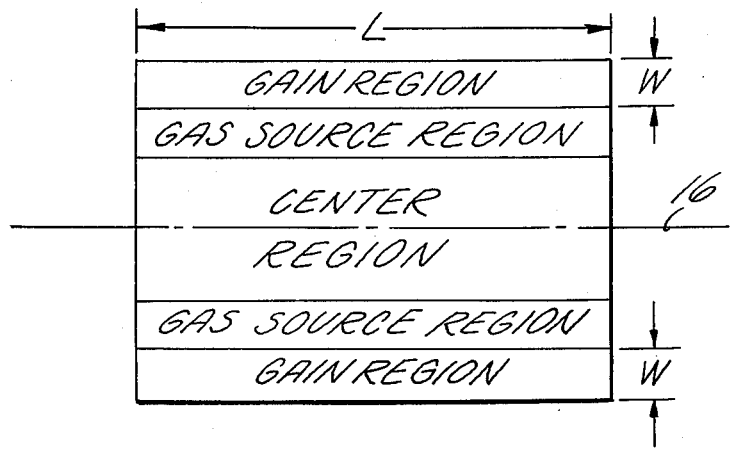
FIG. 2 is a cross sectional view along the lines 2-2 showing the gain, gas source and center regions of such a resonator.

The present invention is the standing wave analog of the teaching provided by Freiberg et al in Application Ser. No. 568,082 entitled Traveling Wave Unstable Resonators For Radial Flow Lasers filed on even date and held with the present application by a common assignee. Referring to FIGS. 1 and 2, the positional relationship between a gain region 10 having a radial width W and a length L, a gas source region 12 and a center region 14 is shown with each region being concentrically positioned about a centerline axis 16. The gas source region usually contains a combustor and nozzle means which provide the required supply of suitably inverted working medium to the gain region. The working medium is provided around the entire inner circumference of the gain region and flows through the gain region radially away from the centerline axis 16.

A cross sectional view of an unstable resonator assembly 18 utilizing an active gain region in the shape of a relatively thin wall cylinder such as that described above is shown in FIG. 3. The resonator is a standing wave, positive branch confocal device. A circular end mirror 20 having a convex reflective surface 22 which is spherical and an annular end mirror 24 having a concave reflective surface 26 which is toroidal define the optical extremes of the resonator. An annular folding mirror 28 having a flat reflective surface 30 which conforms to an inside cone geometry and a conical folding mirror 32 having a flat conical reflective surface 34 positioned symmetrically on the centerline axis 16 cooperate with the end mirrors to define the optical path through the resonator. A coupling mirror 36 having a planar reflective surface and a circular aperture 38 therethrough is positioned symmetrically about the axis.

Figure 3:
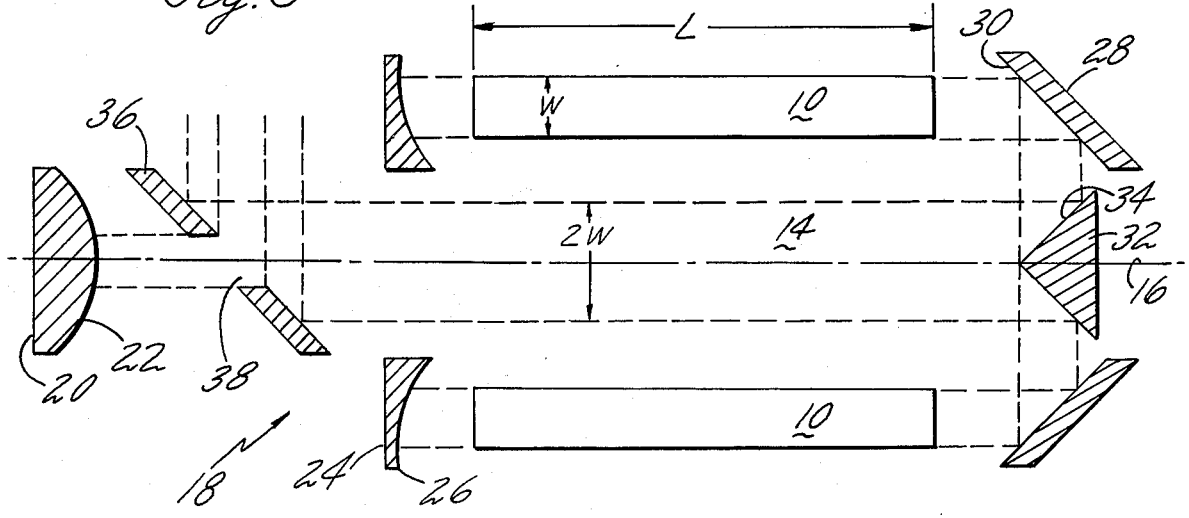
FIG. 3 is a simplified schematic of a cross sectional view of the resonator showing the principal optical elements of a radial flow unstable resonator.

Merely combining convex and concave end mirrors to form an unstable resonator has been done previously, however, in the resonator configuration shown in FIG. 3, the concave end mirror 24 is toroidal and in combination with the convex mirror 20 which is circular, the annular folding mirror 28 having a flat conical surface and the conical folding mirror 32 describe an unstable resonator in which the optical axis of the resonator undergoes a transformation from the centerline axis 16 to the outer cylindrical surface of the gain region 10. The optical axis is located in the lower gain downstream portion of the gain region to allow the higher gain upstream portions of the working medium, which contribute directly to the extracted power in the annular output, to be more effectively saturated by the higher intracavity fluxes. Further locating the optical axis in a region of low intracavity flux minimizes the thermal loading of the conical reflector 32 in the vicinity of its apex, which as a practical matter is often slightly rounded. Also, when the optical axis is located in this manner, the conical reflector serves to compensate for the intensity gradient of the intracavity beam in region 10 and tends to make the intensity profile more uniform in the center region 16.

The intracavity beam in the gain region 10 is collimated and the width W is one half the width of the beam in the center region 14 because the beam which exists in the gain region as a thin wall cylinder is transformed into a beam having a circular cross section in the center region by the annular and conical folding mirrors. The optical axis must be located at the outer cylindrical surface of the gain region 10 to allow the wave fronts of the intracavity beam propagating as a cylindrical sheath in the gain region to combine correctly and in a compatible fashion in the center region 14 of the resonator. The optical quality of the beam in the center region is good as a consequence of the proper transformation of the beam by the folding mirrors and because the Fresnel number representative of the center region 14 is low enough that effective diffractive cross coupling of the phase fronts from various portions throughout the cylindrical region occur and the beam is locked when the cylindrical beam is transformed into a consolidated circular beam around the centerline axis 16.

Figure 4:
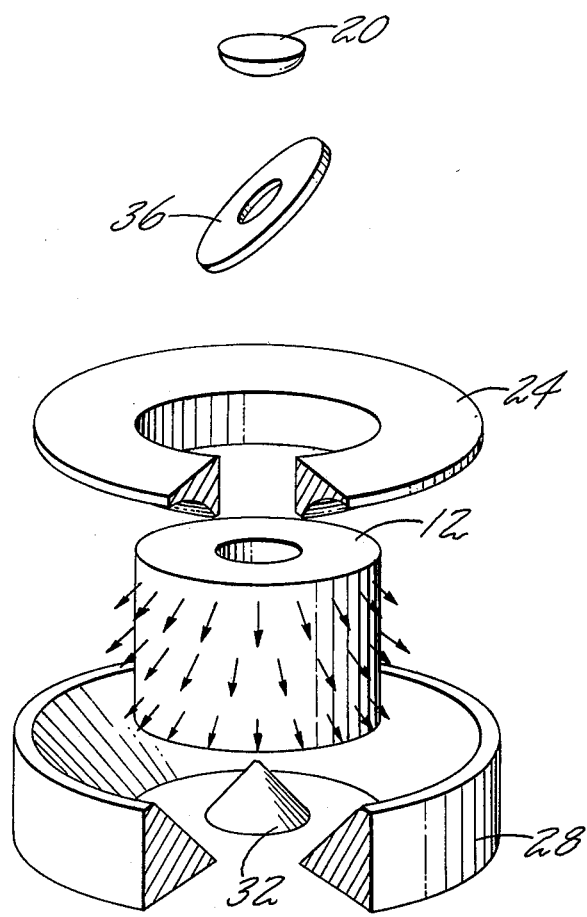
FIG. 4 is a perspective view of the resonator shown in FIG. 3.

FIG. 4 is a simplified three-dimensional perspective sketch of the resonator illustrated in cross section schematically in FIG. 3. The radial direction of the flowing gain medium is indicated. The concave toroidal surface of the annular end mirror, the planar conical surfaces of the annular folding mirror and the central cone, the planar annular output coupling mirror, and the spherical convex surface of the circular end mirror are shown.

Figure 5:
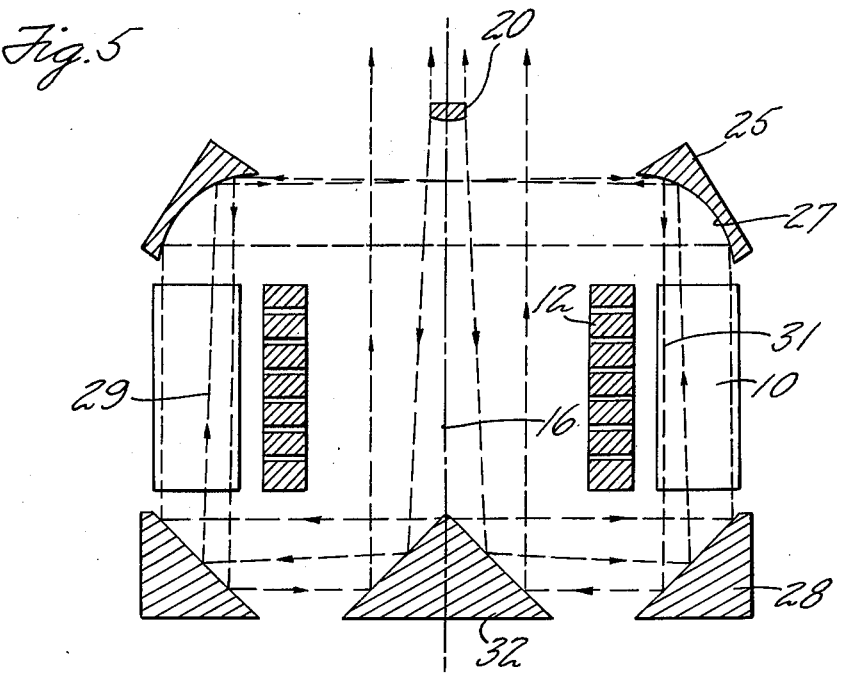
FIG. 5 is a simplified schematic of a cross sectional view of a variation of the unstable resonator shown in FIGS. 3 and 4.

FIG. 5 is a simplified sketch of a cross sectional view of a resonator in which the annular end mirror 24 with a concave toroidal reflecting surface as shown in FIG. 3 is replaced by an annular folding mirror 25 having a concave toroidal reflecting surface 27. The curvature of the toroidal reflecting surface is chosen for the confocal geometry such that the divergent ray 29 upon undergoing two reflections off the annular folding mirror 25 is transformed into a ray 31 propagating parallel to the axis 16. The function served by this toroidal folding mirror is two-fold. The first is to promote stronger interaction with opposite portions of the active gain volume. By directing the intracavity beam through both sides of the gain region 10 twice for each round trip, azimuthal variations in the cylindrical sheath-like volume are effectively averaged out thereby reducing the probability of higher order azimuthal modes in the resonator and hence better beam quality. The second function is concerned with resonator alignment stability. Axicon configurations such as the one formed by the annular folding mirror and the central conical reflector are extremely sensitive to angular misalignment. In a configuration such as that shown in FIG. 3, contributions to the overall system misalignment tend to be accumulative. Therefore, the output power and far field beam quality are adversely affected by relatively small resonator misalignment.

Figure 6:
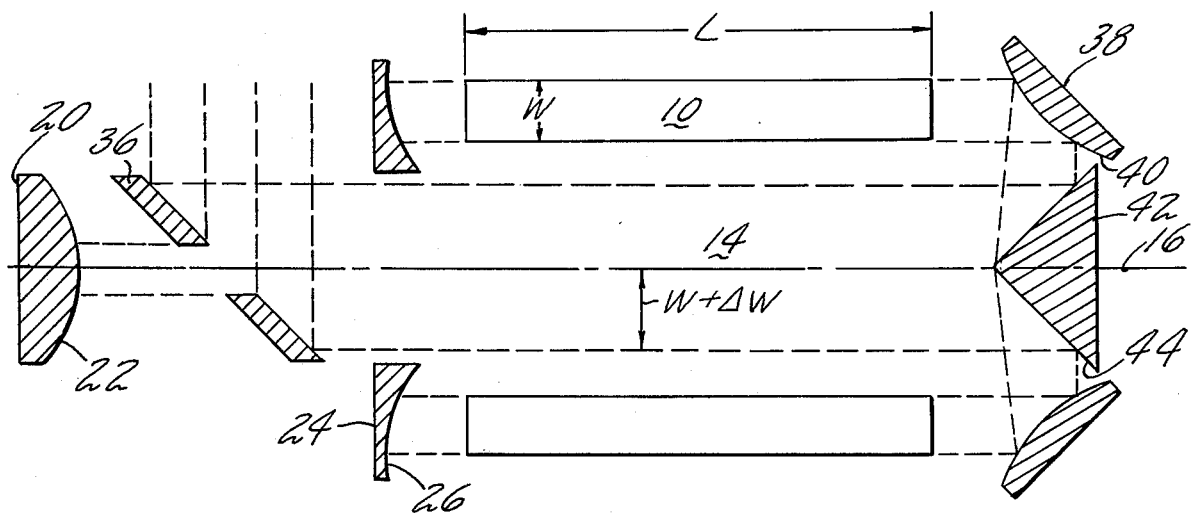
FIG. 6 is a simplified schematic of a cross sectional view of an unstable resonator having optics which provide for an enlarged center region.

In the resonator shown in FIG. 6 the individual contributions tend to be self-compensating rather than accumulative and therefore the output and far field beam quality are significantly less sensitive to resonator misalignment.

The operation of many high power laser resonators frequently requires that the optical flux in the gain region of the cavity be as high as possible in order to effectively saturate the gain of the working medium and to efficiently extract the available power from the resonator. This is particularly important for regions exhibiting the largest small signal gain such as those near the inside surface of the cylindrical sheath of the gain region. An inability to saturate the extraction process limits the power output from such a resonator to something less than what is otherwise available. As a practical matter, the maximum value of optical flux which can be tolerated in the resonator is usually determined by the capacity of the reflective surfaces of the mirrors. In the resonator assembly shown in FIG. 3, the flux of the circular beam in the center region is much greater than the flux of the annular beam in the gain region. The ratio of flux in the gain region to flux in the center region is given by the ratio of their respective cross sectional areas. High flux densities in the gain region are desirable since the higher the flux density the greater the amount of power that can be extracted from the gain region.

Another consideration which suggests that the gain in the system be as high as possible is the effect on the optical quality of the output beam due to anomalous dispersion which is a phenomenon denoting the nonlinear departure of the index of refraction of the medium in the vicinity of the center frequency of a lasing transition. Reducing the gain by effectively saturating the working medium by means of high flux densities is known to decrease the amount of anomalous dispersion. This effect suggests that the flux be as high as possible in the gain region 10. Since the maximum flux is limited by the reflective surfaces forming a resonator in accordance with the present invention, and the highest flux occurs in the circular center region of the resonator shown in FIG. 3, the flux in the annular gain region of the resonator is lower than it might be otherwise. This observation triggered the evolution of resonator geometries in which the flux on he most heavily loaded reflective surfaces is decreased.

One such resonator is shown in FIG. 6. The optics are essentially the same as those in the resonator shown in FIG. 3 except that the annular folding mirror 28 having a flat reflective surface is replaced by an annular folding mirror 38 having a convex toroidal reflective surface 40 and the conical folding mirror 32 is replaced by a conical folding mirror 42 having a concave reflective surface 44. In order to avoid the astigmatic distortion which would result from off normal incidence using spherical surfaces, the annular folding mirror and the conical mirror have the appropriate off axis parabolic convex and concave surfaces respectively. The cumulative effect of the curved surfaces 40, 44 allows the annular beam to be expanded so that the flux on the mirrors in the center region is reduced thereby avoiding the shortcomings mentioned above. These curved surfaces maintain the beam collimated and increase the width of the annular beam in an amount $\Delta W$ so that the diameter of the center region is $2(W + \Delta W)$ where $(1 + \Delta)$ is equal to the magnification of the convex-concave mirror pair.

Alternate embodiments of the same basic apparatus used in FIG. 6 are feasible such as those in which the annular and the conical folding mirrors of the optical chain in the center region are reoriented with respect to what is shown in FIG. 3 to permit a greater separation distance between the annular and conical folding mirrors for a given resonator diameter. The increased distance of separation between the two folding mirrors allows the curvature of the reflecting surfaces to be more gradual, a less critical and more easily fabricated type of reflective surface. Also the mirror configurations can be altered to describe nonconfocal and negative branch resonators.

Although this invention has been shown and described with respect to preferred embodiments thereof, it should be understood by those skilled in the art that various changes and omissions in the form and detail thereof may be made therein without departing from the spirit and the scope of the invention.

Having thus described a typical embodiment of our invention, that which we claim as new and desire to secure by Letters Patent of the United States is:

1. A radial flow laser system having an unstable resonator with a centerline axis and a standing wave optical path and including:
    a first end mirror having a circular reflective surface which is positioned on and symmetrically about the centerline axis;
    a first folding mirror having a conical reflective surface which is positioned on and symmetrically about the centerline axis with the reflective surfaces of the first end and first folding mirrors being optically communicative with each other;
    a second folding mirror having a conical reflective surface which forms an annulus and is positioned symmetrically about the centerline axis with the conical reflective surfaces of the first and second folding mirrors being optically communicative with each other; and
    an annular mirror having a curved reflective surface and positioned symmetrically about the centerline axis with the curved reflective surface optically communicative with the conical surface of the second folding mirror whereby the first end mirror, the first and second folding mirrors and the annular mirror form a standing wave unstable resonator.

2. The invention according to claim 1 wherein the annular mirror is a second end mirror.

3. The invention according to claim 1 wherein the annular mirror is a third folding mirror.

4. The invention according to claim 2 including further a coupling mirror having a flat reflective surface which is circular, the coupling mirror being positioned adjacent to the first end mirror and symmetric about the centerline axis with the plane of the coupling mirror being inclined with respect to the centerline axis and the reflective surface of the coupling mirror being optically communicative with the conical surface of the first folding mirror.

5. The invention according to claim 2 wherein the circular reflective surface of the first end mirror is convex.

6. The invention according to claim 2 wherein the conical reflective surface of the first folding mirror is flat.

7. The invention according to claim 2 wherein the reflective surface of the second end mirror is concave.

8. The invention according to claim 2 wherein the conical reflective surface of the second folding mirror is flat.

9. The invention according to claim 2 wherein the conical reflective surfaces of the first and second folding mirrors are curved.

10. The invention according to claim 1 including further means for providing a laser gain medium to a gain region between the second end mirror and the second folding mirror, the direction of flow of the gain medium being radially away from the centerline axis whereby the gain region assumes the configuration of a relatively thin wall cylinder which is symmetric about the centerline axis.

11. A radial flow laser system having an unstable resonator with a standing wave optical path and including:
   a first end mirror having a circular reflective surface which is positioned on and symmetrical about a centerline axis;
   a first folding mirror having a conical reflective surface which is positioned on and symmetrically about the centerline axis with the apex of the conical surface disposed in the direction of the reflective surface of the first end mirror;
   a second folding mirror having a conical reflective surface which forms an annulus and is positioned symmetrically about the centerline axis with the apex of the conical surface disposed away from the reflective surface of the first end mirror and with the conical reflective surfaces of the first and second folding mirrors being optically communicative with each other; and
   an annular mirror having a curved reflective surface and positioned symmetrically about the centerline axis with the curved reflective surface optically communicative with the conical surface of the second folding mirror wherein the first end mirror, the first and second folding mirrors and the annular mirror form a standing wave unstable resonator.

* * * * *

UNITED STATES PATENT OFFICE
CERTIFICATE OF CORRECTION

PATENT NO. : 3,969,687
DATED : July 13, 1976
INVENTOR(S) : ROBERT J. FREIBERG and GEORGE H. McLAFFERTY It is certified that error appears in the above-identified patent and that said Letters Patent are hereby corrected as shown below:

| | |
|---|---|
| Page 1, Attorney's name | delete "Crisco" and insert -- Criso -- |
| Column 1, line 49 | after "entitled" insert -- Unstable -- |
| Column 5, line 41 | delete "he" and insert -- the -- |

Signed and Sealed this

Thirtieth Day of November 1976

[SEAL]

Attest:

RUTH C. MASON
Attesting Officer

C. MARSHALL DANN
Commissioner of Patents and Trademarks